3,215,740
HYDRAZONIUM BOROHYDRIDES AND
FLUORIDES AND METHOD FOR THEIR
PREPARATION
Allen F. Graefe, Pomona, and Carl L. Randolph, Jr.,
La Habra, Calif., assignors to Aerojet-General Corporation, Azusa, Calif., a corporation of Ohio
No Drawing. Filed Feb. 5, 1962, Ser. No. 172,055
15 Claims. (Cl. 260—583)

This invention relates to novel chemical compounds, their method of preparation, and use. More specifically, the invention relates to novel, stable hydrazonium borohydrides which are of value as high-energy propellants. In another aspect of this invention, the hydrazonium borohydrides are prepared from novel hydrazonium fluorides. These novel hydrazonium fluorides also form a part of this invention. These and other features of the invention will be apparent from the description which follows.

Heretofore it has not been possible to obtain stable hydrazonium borohydrides. As is shown in United States Patent 3,000,712, issued September 19, 1961, all attempts to isolate the previously known hydrazonium borohydrides have been unsuccessful since the compounds decompose upon heating.

An object of this invention is to prepare new hydrazonium borohydride compounds which are stable in their pure form. Another object of this invention is to synthesize certain novel hydrazonium fluorides which can be readily converted to the hydrazonium borohydrides. A more specific object of this invention resides in the preparation of stable hydrazonium borohydrides containing at least three alkyl groups per molecule which are especially useful as high-enerby fuels. Other objects and advantages will appear hereinafter.

The stable hydrazonium borohydrides of this invention have the following generic formula:

I. 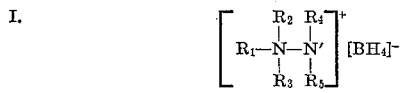

wherein $R_1$, $R_2$, and $R_3$ are alkyl and $R_4$ and $R_5$ are the same or different and are selected from the class consisting of hydrogen and alkyl groups. The alkyl groups can be either branched or straight chain. Preferred alkyl groups are the lower alkyl groups, i.e., from about one to ten carbon atoms, such as methyl, ethyl, isopropyl, neopentyl, etc. It has been found that the hydrazonium borohydrides having less than ten carbon atoms in the alkyl substituents produce superior energy yields, thus making them outstanding propellants. Because of their superior stability, the hydrazonium borohydrides of this invention are capable of being stored for long periods without appreciable decomposition.

The novel hydrazonium fluorides which form a part of this invention have the following generic formula:

II. 

wherein $R_1$, $R_2$, $R_3$, $R_4$, and $R_5$ are the same or different and are selected from the class consisting of hydrogen and alkyl groups. Preferred alkyl groups are the lower alkyls having from one to ten carbon atoms. The alkyl groups may be branched or straight chain. The hydrazonium fluorides of this invention are unique among hydrazonium halides in that they are extremely deliquescent and hygroscopic, thereby providing an energetic fuel component which is capable of taking up undesirable traces of water in a fuel composition.

The hydrazonium fluorides in the above generic formula are especially advantageous in that they are readily converted by reaction with metallic borohydrides to give hydrazonium borohydrides free of undesirable contaminants. This reaction is shown in the following equation:

I. 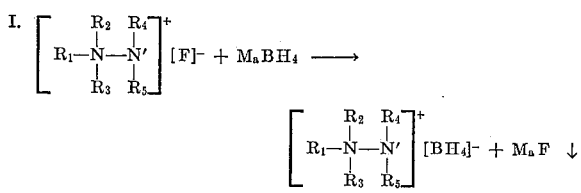

wherein $R_1$, $R_2$, $R_3$, $R_4$, and $R_5$ are as defined in Formula I above. $M_a$ is an alkali or alkaline earth metal such as lithium, sodium, potassium, cesium, calcium, strontium, or barium. The preferred metallic borohydride is sodium borohydride since it is most readily available.

While reaction I can be carried out with any hydrazonium fluoride, it has been found that, for the production of useful hydrazonium borohydride solid propellants, compounds wherein $R_1$, $R_2$, and $R_3$ are alkyl must be used. The hydrazonium borohydride compounds containing less than three alkyl groups per molecule have been found to be very unstable and could not be isolated.

The hydrazonium fluorides of Formula II are prepared by the reaction of the corresponding hydrazonium chloride, bromide, or iodide with a metal fluoride in accordance with the following equation:

II. 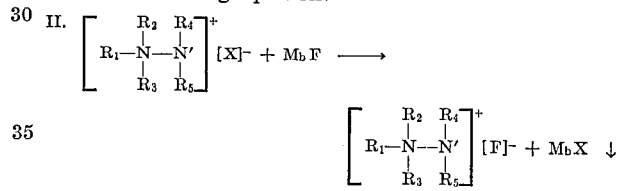

wherein $R_1$, $R_2$, $R_3$, $R_4$, and $R_5$ are as has been defined in Formula II above and X is selected from the group consisting of iodine, bromine, and chlorine. $M_b$ is a metal ion capable of reacting with the iodide, bromide, or chloride ion to form a precipitate which is insoluble in polar solvents, i.e., silver ion.

Reaction I is conducted at a temperature which is sufficiently low to maintain metallic borohydride in solution. Normally the reaction temperature is less than 0° C. and usually around −45° C. Preparation of the hydrazonium borohydrides is carried out in a low temperature solvent in which the hydrazonium borohydrides and metallic borohydrides are soluble. An example of such a solvent is ammonia. In the preparation of hydrazonium borohydrides, it is desirable to use the hydrazonium fluorides in an amount in excess of the amount of metallic borohydride employed since some of the insoluble metallic fluoride formed during the reaction can precipitate on the surface of the insoluble and still reacted hydrazonium fluoride thus preventing the latter from reacting further. This precaution toward insuring complete reaction is also desirable for the added reason that any unreacted metallic borohydride cannot be readily separated from the desired hydrazonium borohydride.

Reaction II above is normally conducted in the presence of an inert medium which is a polar solvent in which the reactants are soluble. Typical suitable solvents are water and methanol although many other polar solvents are satisfactory. This reaction can be carried out at any convenient temperature above the freezing point of the solvent and below the decomposition temperature of the reactants. Normally the temperature employed is between 0° C. and 100° C. Room temperature (25° C.) is usually the most satisfactory and convenient temperature. The relative amounts of the hydrazonium halide and metal fluoride employed in reaction II may be varied within wide ranges. Most often, the hydrazonium halide is used in an amount which is slightly in excess of the amount of the metal fluoride employed in the reaction so as to insure complete utilization of the metal fluoride.

Since pressure is not critical in either of the above reactions, these reactions are most conveniently carried out at atmospheric pressure. The reaction rates in these reactions may be improved by the use of agitation.

The hydrazonium borohydrides and hydrazonium fluorides of this invention are salts and are isolated in a conventional manner; i.e., by evaporation, filtration, and/or crystallization.

In the examples which follow, the percentages are by weight unless otherwise indicated.

EXAMPLE I

*The preparation of N,N,N-trimethyl hydrazonium fluoride dihydrate*

An aqueous solution of 86 g. of N,N,N-trimethyl hydrazonium iodide [prepared in the manner disclosed by F. Klages, Ann., 547, 39–64 (1941)] in 350 ml. of water was added dropwise to 70 ml. of a 10 M aqueous silver fluoride [prepared in the manner disclosed by M. D. Banus et al., J. Am. Chem. Soc., 74, 2346 (1952)] solution until a slight excess of iodine was present. The solution was filtered to remove the insoluble silver iodide precipitate. Titration of an aliquot of the filtered solution with potassium iodate indicated that N,N,N-trimethyl hydrazonium iodide had been added in a two percent excess based on the amount of silver fluoride used. Water was removed from the product in vacuo at 70° C. The product became crystalline only when the small amount of water which still remained was removed by successive azeotropic distillations with absolute ethanol (three times) and with benzene (one time). The resulting N,N,N-trimethyl hydrazonium fluoride dihydrate was crushed in a mortar (dry box) and the product was obtained as a micro-crystalline powder (35 g.). This material was found to be extremely hygroscopic. Titration of a sufficiently large sample of the product with potassium iodate indicated that the fluoride had crystallized with 2 moles of water. Anhydrous N,N,N-trimethyl hydrazonium fluoride is obtained by heating the dihydrate in a vacuum in the presence of a drying agent, preferably sulfuric acid.

Other hydrazonium fluorides can be prepared according to the technique set forth in Example I. Hydrazonium chloride, N-pentyl hydrazonium bromide, and N,N,N-trimethyl-N'-methyl hydrazonium iodide are easily reacted with silver fluoride to yield hydrazonium fluoride, N-pentyl hydrazonium fluoride, and N,N,N-trimethyl-N'-methyl hydrazonium fluoride, respectively.

EXAMPLE II

*The preparation of N,N,N-trimethyl hydrazonium borohydride*

Preparation of N,N,N-trimethyl hydrazonium borohydride was carried out in liquid ammonia. About 250 ml. of refrigeration-grade ammonia was distilled into a 500-ml., three-necked, round-bottom flask, fitted with a mercury sealed stirrer, and a Dry Ice condenser. After the distillation of the ammonia, the ammonia inlet was replaced by a solid addition funnel containing about 11 g. of N,N,N-trimethyl hydrazonium fluoride dihydrate. The fluoride was added proportion-wise with constant stirring while the temperature was maintained at −45° C. The addition was repeated with 1.61 g. of sodium borohydride contained in the solid addition funnel. A onefold excess of the fluoride was employed so that complete reaction of the sodium borohydride would occur. No hydrogen evolution was observed. The reaction mixture was stirred for four hours at −45° C. and then allowed to warm to 0° C. The product was maintained at 0° C. while the residual ammonia was removed under reduced pressure. The flask was now connected to a gas buret and it was found that no hydrogen evolution occurred after several hours at 0° C. or subsequently after several hours at room temperature. The product (11.2 g.) was then extracted with distilled liquid ammonia for about four hours. Volatilization of the ammonia followed by desiccation yielded 2.9 g. of a gray-white crystalline product. The product was found to be highly reactant toward water with a simultaneous evolution of hydrogen. In this connection the solid was found to be extremely hygroscopic. An analysis of the solid product by titration with hydrochloric acid to the methyl red endpoint indicated a purity for the material of about 71.8 percent calculated as N,N,N-trimethyl hydrazonium borohydride. The crystalline product was further analysed for nitrogen. The results of two Kjeldahl analyses indicated the product to be 74.6 and 76.1 percent pure calculated as N,N,N-trimethyl hydrazonium borohydride.

Other hydrazonium borohydrides having similar structures can be prepared by the method of Example II. N,N,N - trimethyl - N' - methyl hydrazonium fluoride; N,N,N-triethyl-N',N'-diethyl hydrazonium fluoride; and N,N,N-tridecyl hydrazonium fluoride are easily reacted with metallic borohydrides according to our invention to yield N,N,N-trimethyl-N'-methyl hydrazonium borohydride; N,N,N-triethyl-N',N'-diethyl hydrazonium borohydride; and N,N,N-tridecyl hydrazonium borohydride, respectively. Those skilled in the art will readily appreciate the fact that other hydrazonium borohydrides having other alkyl substituents can be prepared according to our invention by the method described above simply by reacting appropriate starting materials.

The hydrazonium borohydrides of this invention are useful as high-energy solid propellants. Because of their stability, these compounds can be easily transported and stored. The hydrazonium borohydrides are also advantageous in that no metallic oxides except boric oxide are produced upon combustion. The hydrazonium borohydrides can also be used as an additive to existing high-energy fuels such as hydrazine thereby providing a hydrazine-base fuel having a sufficiently low freezing point to permit its use in rocket motors while at the same time providing a hydrazine fuel having a higher specific impulse than can be obtained with hydrazine per se.

It will be understood that various modifications may be made in this invention without departing from the spirit thereof or the scope of the appended claims.

We claim:

1. Hydrazonium borohydride compounds having the formula

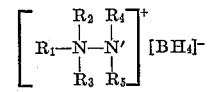

wherein $R_1$, $R_2$, and $R_3$ are alkyl groups and $R_4$ and $R_5$ are selected from the class consisting of hydrogen and alkyl groups.

2. Hydrazonium borohydride compounds of claim 1 wherein $R_1$, $R_2$, and $R_3$ are lower alkyl groups.

3. The compound N,N,N-trimethyl hydrazonium borohydride.

4. The method of making hydrazonium borohydride compounds having the formula

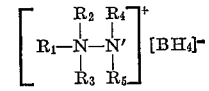

which comprises reacting at a temperature below 0° C. a metal borohydride of the formula $M_aBH_4$ with a hydrazonium fluoride having the formula

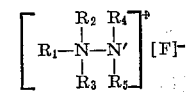

wherein $R_1$, $R_2$, and $R_3$ are alkyl groups; $R_4$ and $R_5$ are selected from the class consisting of hydrogen and alkyl groups; and $M_a$ is a metal selected from the class consisting of alkali and alkaline earth metals.

5. The method of claim 4 wherein the $R_1$, $R_2$, and $R_3$ in each of the formulas are lower alkyl groups.

6. The method of claim 4 in which the reaction is conducted in the presence of a low temperature solvent.

7. The hydrazonium fluoride compounds having the formula

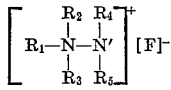

wherein $R_1$, $R_2$, $R_3$, $R_4$, and $R_5$ are selected from the class consisting of hydrogen and alkyl groups.

8. The compounds of claim 7 wherein the hydrazonium fluorides are in the form of the dihydrate salts.

9. The hydrazonium fluoride compounds of claim 7 wherein $R_1$, $R_2$, $R_3$, $R_4$, and $R_5$ are lower alkyl groups.

10. The compound N,N,N-trimethyl hydrazonium fluoride.

11. The method of preparing compounds having the formula

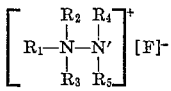

which comprises reacting in the presence of a polar solvent in which the reactants are soluble, silver fluoride with a hydrazonium halide having the formula

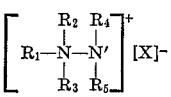

wherein $R_1$, $R_2$, $R_3$, $R_4$, and $R_5$ in the foregoing formulae are selected from the class consisting of hydrogen and alkyl groups, and X in the above formula is selected from the class consisting of iodine, bromine and chlorine ions.

12. The method of claim 11 wherein $R_1$, $R_2$, and $R_3$ in each of the formulas are alkyl groups.

13. The method of claim 11 wherein $R_1$, $R_2$, and $R_3$ are lower alkyl groups.

14. The method of claim 11 in which the reaction is conducted at room temperature.

15. The method which comprises reacting silver fluoride with a hydrazonium halide having the formula

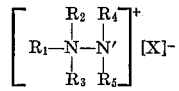

in the presence of a polar solvent in which the reactants are soluble, to form a hydrazonium fluoride of the formula

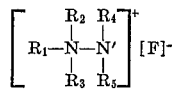

and reacting said hydrazonium fluoride with a metal borohydride of the formula $M_aBH_4$ at a temperature below 0° C. to form a stable hydrazonium borohydride of the formula

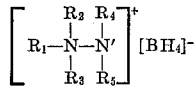

wherein in the above formulae $R_1$, $R_2$ and $R_3$ are alkyl groups, $R_4$ and $R_5$ are selected from the group consisting of hydrogen and alkyl groups, $M_a$ is a metal selected from the class consisting of alkali and alkaline earth metals, and X is selected from the class consisting of iodine, bromine and chlorine ions.

References Cited by the Examiner

UNITED STATES PATENTS

| | | |
|---|---|---|
| 1,960,712 | 5/34 | Reimers. |
| 2,885,399 | 5/59 | Omietanski _____ 260—583 |
| 2,955,108 | 10/60 | Omietanski _____ 260—583 |

OTHER REFERENCES

Lovelace et al.: "Aliphatic Fluorine Compounds," Reinhold Publishing Corp., New York (1958), pp. 3 and 4.

Notch, C. A., vol. 54, 24347g (1960).

Robinette et al.: Chem. Abstracts, vol. 53 (1959), p. 19399.

CHARLES B. PARKER, *Primary Examiner.*

L. D. ROSDOL, *Examiner.*